Patented Nov. 11, 1947

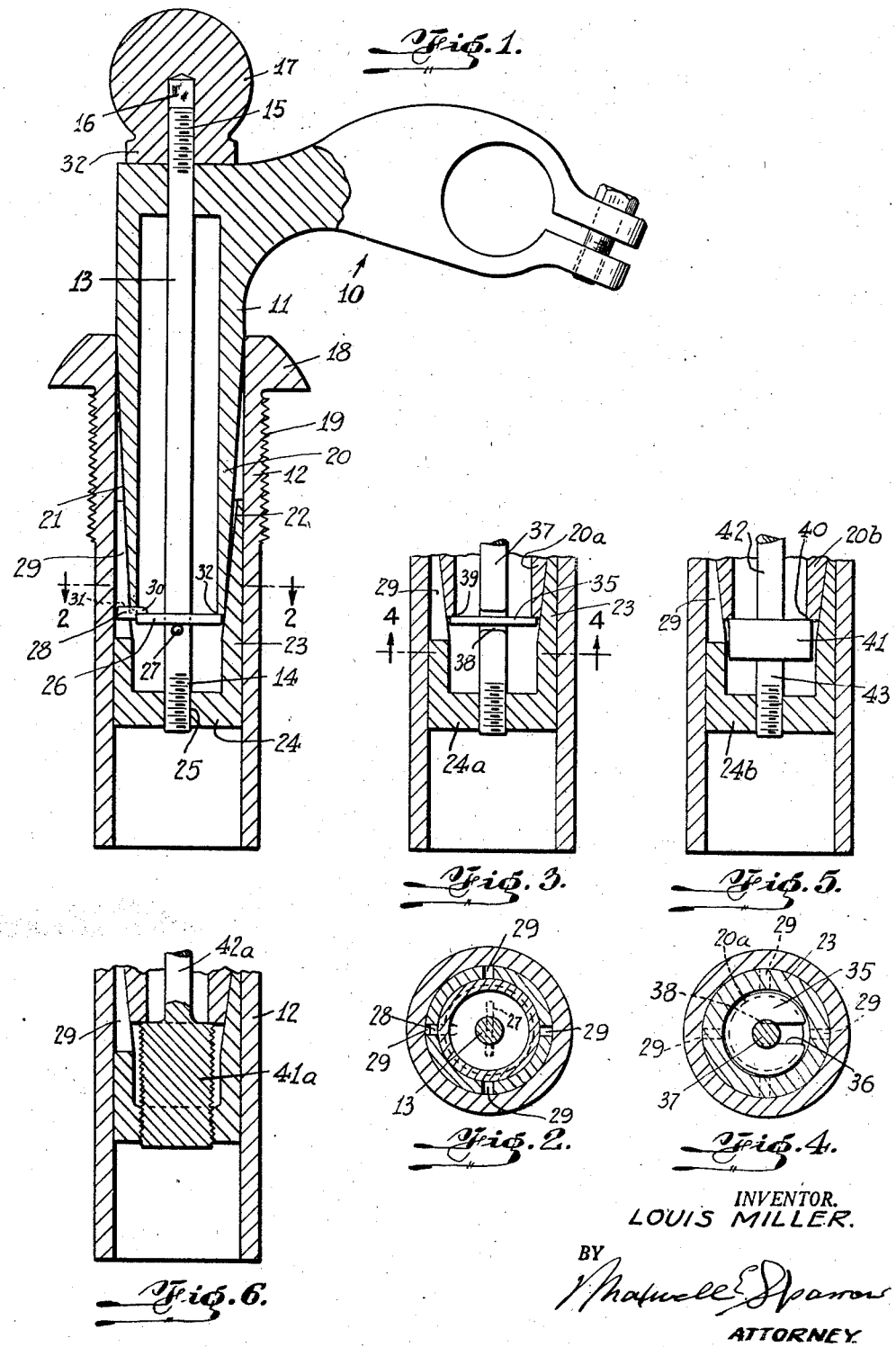

2,430,524

UNITED STATES PATENT OFFICE 2,430,524

EXTENSION LOCK FOR BICYCLES AND THE LIKE

Louis Miller, New York, N. Y.

Application December 22, 1945, Serial No. 637,065

6 Claims. (Cl. 287—54)

1

This invention relates to improvements in extension lock for bicycles, handle bars and the like.

It is an object of the present invention to provide an improved, efficient, economical, simple and practical extension lock particularly adapted for use in connection with bicycle handle bars, and which overcomes the defects and disadvantages present in heretofore existing types of extension locks.

It is a further object of the present invention to provide an extension lock adapted for use at the fork of the bicycle, which is safer and more dependent than heretofore known devices, and which is operable to expand in the fork of the bicycle and grip therewithin and therewith to a far greater extent than the heretofore known devices. As an example, it has been found that the average old type of extension lock will grip the inside of the hollow fork (around its inner wall) to a degree of only one-eighth to three-sixteenths of an inch, whereas, the extension lock made according to this invention will grip the inside wall of the hollow fork in a more efficient manner and substantially between three-quarters of an inch to one inch, and will expand substantially one-sixteenth of an inch within the fork.

It is a further object of the present invention to provide an extension lock for bicycles which will maintain in position the cone holding the bearings as well as the locknut which holds the cone, whereby upon spreading of the extension lock, the entire head set is held together during the setting in of the parts.

These and other objects of the invention and the means for their attainment will be more apparent from the following detailed description, taken in connection with the accompanying drawing, illustrating certain embodiments of which the invention may be realized, and in which:

Fig. 1 is an elevational view, partly in section of the front upper portion of a bicycle handle bar and lock incorporating the invention;

Fig. 2 is a sectional view taken on line 2—2 of Fig. 1;

Fig. 3 is a bottom portion similar to Fig. 1, but incorporating a modification thereof;

Fig. 4 is a sectional view taken on line 4—4 of Fig. 3; and

Figs. 5 and 6 are views similar to Fig. 3 and incorporating additional modifications.

Referring now more particularly to the drawing which illustrates examples of carrying the invention, there is disclosed in Fig. 1, the clamping portion of the handle bar 10 comprising the extension part 11 and the sleeve portion 12.

Within the extension portion 11 is a threaded shaft 13 having the threaded end portions 14 and 15.

At 16 the end portion of 15 of the shaft 13 is flattened or squared to permit the use of a wrench for removal purposes in a manner later described. A threaded head or nut 17 preferably of ornamental design is applied to the threaded end 15 of the shaft 13. The sleeve 12 has at its upper end the conventional nut portion 18 and the threaded portion 19. The lower end 20 of the extension portion 11 is provided with a tapered surface as at 21 which fits into the tapered portion 22 of a sleeve 23. The sleeve 23, has a bottom wall 24, provided with a threaded opening 25 to receive the threaded end 14 of the shaft 13.

A washer 26 is suspended on the shaft 13 by means of a pin 27. The said washer 26 is provided with a finger extension 28 fitting into one of the four slots 29 provided in the sleeve 23. The finger 28 projects above the surface of the washer 26, forming a shoulder 30 which fits into a notch 31 of the extension sleeve 20, thus preventing the sleeve 20 from turning within the sleeve 23.

One means of assembling the device for use may comprise threadedly engaging the bottom 24 of sleeve or cylindrical nut unit 23 with the lower threaded end of shaft 13; projecting the shaft 13 through the extension portion 11 and engaging the threaded end 15 of shaft 13 with the threaded head or nut 17. This assembly is then inserted into the sleeve portion 12. By now engaging the polygonal-sided portion 32 of head 17 with a wrench or pliers, the shaft 13 may be rotated, thus causing the wedging of sleeve 23 between the conical or tapered portion 20 of extension 11 and the sleeve 12, achieving a tight engagement between the members 11, 23 and 12.

To disassemble the various parts the head 17 is removed from shaft 13, the shaft 13 is then rotated by means of a wrench engaging the flat portion 16 thus spreading the sleeve 23 and the washer 26 respectively. This spreading will cause the washer 26, which is resting against the bottom of the sleeve 20 as at 32 to push against the sleeve 20 and thus force the same from within the sleeve 12.

In the modification illustrated in Fig. 3, a washer 35 is provided with a slot 36 slightly smaller than the diameter of the shaft 37. At 38 the shaft 37 is provided with a recess to accommodate the washer 35. Washer 35 is slotted to slide in groove 38.

Thus when the shaft 37 is unscrewed from the sleeve 24a (similar to the description for Fig. 1) the washer 35 will push against the lower edge 39 of the sleeve 20a, thus separating the wedged in parts.

In the modification illustrated in Fig. 5, instead of utilizing either washer 26 or 35 the push against the edge 40 of the sleeve of 20b is provided by an enlargement 41 integral with the shaft 42 thus again causing the spreading of the members 24b and 20b when unscrewing the shaft 42.

The enlargement 41 may be a portion upset on shaft 42, or the element 26 or 35.

The difference between the modification shown in Fig. 5 and that in Fig. 6 is only that the lower portion 43 of the shaft 42 in Fig. 5 is cut down to the same diameter as shaft 42 while the modification illustrated in Fig. 6 shows the enlargement 41a continuous to the end of the shaft 42a thus avoiding an additional operation in the manufacture of the shaft.

Although the invention has been described in connection with a handle bar holder extension, it is understood that the same is applicable in connection with the seat post of a bicycle, and the like.

Although the drawing and the above specification discloses the best mode in which I have contemplated embodying my invention, I desire in no way to be limited to the details of such disclosure, for in the further practical application of my invention many changes in the forms and proportions may be made as circumstances require or experience suggests without departing from the spirit of the invention within the scope of the appended claims.

Having thus described my invention, what I claim as new and desire to secure by Letters Patent is:

1. The combination with a tapered extension having a longitudinal bore and a threaded element extending within said bore and projecting from both ends of said extension and a tubular device, of means for locking said extension with its tapered portion within said tubular device, said means comprising a substantially cylindrical nut unit having a base adapted to threadedly engage said element and further having a substantially cylindrical tapered wall above said base, said wall having a plurality of slots and being adapted to project between said tapered portion of said extension and said tubular device, and an enlargement carried by said element adapted to bear against the end of said tapered portion of said extension.

2. The combination with a tapered extension having a longitudinal bore and a threaded element extending within said bore and projecting from both ends of said extension and a tubular device, of means for locking said extension with its tapered portion within said tubular device, said means comprising a substantially cylindrical nut unit having a base adapted to threadedly engage said element and further having a substantially cylindrical tapered wall above said base, said wall having a plurality of slots and being adapted to project between said tapered portion of said extension and said tubular device, and means carried by said element adapted to bear against the end of said tapered portion of said extension.

3. The combination with a tapered extension having a longitudinal bore and a threaded element extending within said bore and projecting from both ends of said extension and a tubular device, of means for locking said extension with its tapered portion within said tubular device, said means comprising a substantially cylindrical nut unit having a base adapted to threadedly engage said element and further having a substantially cylindrical tapered wall above said base, said wall being adapted to project between said tapered portion of said extension and said tubular device, and means carried by said element adapted to bear against one of the ends of said extension.

4. The combination with a tapered extension having a longitudinal bore and a threaded element extending within said bore and projecting from both ends of said extension and a tubular device, of means for locking said extension with its tapered portion within said tubular device, said means comprising a substantially cylindrical nut unit having a base adapted to threadedly engage said element and further having a substantially cylindrical tapered wall above said base, said wall having a plurality of slots and being adapted to project between said tapered portion of said extension and said tubular device, and means carried by said element having a member adapted to bear against the tapered end of said extension and a member adapted to extend within one of the slots of said plurality of slots.

5. The combination with a tapered extension having a longitudinal bore and a threaded element extending within said bore and projecting from both ends of said extension and a tubular device, of means for locking said extension with its tapered portion within said tubular device, said means comprising a substantially cylindrical nut unit having a base adapted to threadedly engage said element and further having a substantially cylindrical tapered wall above said base, said wall having a plurality of slots and being adapted to project between said tapered portion of said extension and said tubular device.

6. The combination with a tapered extension having a longitudinal bore, an element threaded at both its ends, and a tubular device, said element extending within said bore and having its threaded ends projecting from both ends of said extension; of means for locking said extension with its tapered portion within said tubular device, said means comprising a nut removably engaging one of the threaded ends of said element; a substantially cylindrical nut unit having a base adapted to threadedly engage the other of the threaded ends of said element and further having a substantially cylindrical tapered wall above said base, said wall having a plurality of slots and being adapted to project between said tapered portion of said extension and said tubular device.

LOUIS MILLER.

REFERENCES CITED

The following references are of record in the file of this patent:

UNITED STATES PATENTS

| Number | Name | Date |
|---|---|---|
| 308,639 | Stevens | Dec. 2, 1884 |
| 1,755,264 | Mirzan | Apr. 22, 1930 |

FOREIGN PATENTS

| Number | Country | Date |
|---|---|---|
| 451,588 | France | Feb. 15, 1913 |
| 46,264 | Norway | Mar. 18, 1929 |